United States Patent
Lanktree et al.

(10) Patent No.: US 10,514,017 B2
(45) Date of Patent: Dec. 24, 2019

(54) INTERNAL COMBUSTION ENGINE WITH IGNITER COOLING SLEEVE

(71) Applicant: PRATT & WHITNEY CANADA CORP., Longueuil (CA)

(72) Inventors: Michael Lanktree, La Prairie (CA); Edwin Schulz, Saint-Bruno-de-Montarville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 234 days.

(21) Appl. No.: 15/464,783

(22) Filed: Mar. 21, 2017

(65) Prior Publication Data
US 2018/0274513 A1 Sep. 27, 2018

(51) Int. Cl.
| | |
|---|---|
| *F02P 15/00* | (2006.01) |
| *F01C 1/00* | (2006.01) |
| *F02B 19/12* | (2006.01) |
| *F23Q 7/00* | (2006.01) |
| *F02P 13/00* | (2006.01) |
| *F02B 19/00* | (2006.01) |
| *F02B 53/10* | (2006.01) |
| *F02B 9/08* | (2006.01) |
| *F02B 19/10* | (2006.01) |
| *F02B 53/12* | (2006.01) |
| *F02B 53/00* | (2006.01) |

(Continued)

(52) U.S. Cl.
CPC .............. *F02P 15/006* (2013.01); *F02B 9/08* (2013.01); *F02B 19/108* (2013.01); *F02B 19/12* (2013.01); *F02B 53/10* (2013.01); *F01C 1/22* (2013.01); *F02B 53/12* (2013.01); *F02B 2019/002* (2013.01); *F02B 2053/005* (2013.01); *F02P 13/00* (2013.01); *F02P 15/005* (2013.01); *F02P 19/02* (2013.01); *Y02T 10/125* (2013.01)

(58) Field of Classification Search
CPC . F02P 13/00; F02P 15/006; F01C 1/00; F02B 19/12; F02B 53/10; F02B 19/108; F02B 19/00; F23Q 7/001; F23Q 7/004; F02M 57/00
USPC .......................................................... 123/209
See application file for complete search history.

(56) References Cited

U.S. PATENT DOCUMENTS

| | | | | |
|---|---|---|---|---|
| 3,954,088 A | * | 5/1976 | Scott | ....................... F02B 55/14 123/209 |
| 6,111,223 A | | 8/2000 | Tatematsu | |

(Continued)

FOREIGN PATENT DOCUMENTS

| | | |
|---|---|---|
| FR | 3022012 B1 | 8/2016 |
| JP | 02955273 B1 | 10/1999 |

(Continued)

*Primary Examiner* — Deming Wan
(74) *Attorney, Agent, or Firm* — Norton Rose Fulbright Canada LLP (57) ABSTRACT

An internal combustion engine including an igniter disposed at least partially within an aperture defined in a housing of the engine, the igniter having a body including a tip supporting portion and having a tip extending from the tip supporting portion. A cooling sleeve is disposed around the tip supporting portion, and the cooling sleeve defines a path of heat transfer between the tip supporting portion and the housing. The engine may be a rotary engine. A method for cooling an igniter of an internal combustion engine is also discussed.

18 Claims, 5 Drawing Sheets

(51) Int. Cl.
    *F02P 19/02*       (2006.01)
    *F01C 1/22*        (2006.01)

(56) References Cited

U.S. PATENT DOCUMENTS

| | | | | |
|---|---|---|---|---|
| 6,285,007 | B1* | 9/2001 | Chiu | F02B 23/0657 |
| | | | | 123/145 A |
| 6,689,990 | B2 | 2/2004 | Taniguchi et al. | |
| 7,753,036 | B2 | 7/2010 | Lents et al. | |
| 7,775,044 | B2 | 8/2010 | Julien et al. | |
| 8,471,180 | B2 | 6/2013 | Cheng et al. | |
| 9,247,585 | B2 | 1/2016 | Sekiguchi et al. | |
| 2012/0199088 | A1* | 8/2012 | Burrows | F02P 9/007 |
| | | | | 123/143 B |
| 2013/0313244 | A1* | 11/2013 | Matsui | H05B 3/44 |
| | | | | 219/270 |
| 2014/0373800 | A1* | 12/2014 | Hirata | F23Q 7/001 |
| | | | | 123/145 A |
| 2015/0211410 | A1 | 7/2015 | Saville et al. | |
| 2015/0275749 | A1 | 10/2015 | Thomassin et al. | |
| 2015/0275756 | A1 | 10/2015 | Bolduc et al. | |
| 2015/0369485 | A1 | 12/2015 | Cho et al. | |
| 2017/0038069 | A1 | 2/2017 | Takatsu | |
| 2017/0321899 | A1 | 11/2017 | Takatsu | |

FOREIGN PATENT DOCUMENTS

| | | | |
|---|---|---|---|
| JP | 05062078 | B2 | 10/2012 |
| JP | 06245716 | B2 | 12/2017 |
| JP | 06265570 | B2 | 1/2018 |
| JP | 06270185 | B2 | 1/2018 |
| KR | 485679 | B1 | 7/2005 |

\* cited by examiner

INTERNAL COMBUSTION ENGINE WITH IGNITER COOLING SLEEVE

TECHNICAL FIELD

The application relates generally to internal combustion engines and, more particularly, to igniters used in such engines.

BACKGROUND OF THE ART

Internal combustion engines use igniters having a tip communicating with a combustion chamber for igniting an air-fuel mixture located therein. In some cases, the igniter tip may lack sufficient time to cool down between each combustion cycle. When the igniter is subjected to high temperatures and inadequate cooling, the igniter tip may separate from the igniter and be ingested into the combustion chamber, possibly causing damage to the engine.

SUMMARY

In one aspect, there is provided a rotary engine comprising: a housing having an internal cavity; a rotor received in the internal cavity and cooperating with the housing to define combustion chambers of variable volume in the internal cavity; a fuel injector communicating with the combustion chambers; an igniter disposed at least partially within an aperture defined in the housing, the igniter having a body including a tip supporting portion and having a tip extending from the tip supporting portion, the tip configured to ignite fuel injected by the fuel injector; and a cooling sleeve received in the aperture and disposed around the tip supporting portion, the cooling sleeve defining a path of heat transfer between the tip supporting portion and the housing.

In another aspect, there is provided an internal combustion engine comprising a housing defining a cavity and an inner body sealingly moving inside the cavity for defining at least one combustion chamber of variable volume, the internal combustion engine further comprising an igniter disposed at least partially within an aperture extending through the housing, the igniter having a body including a tip supporting portion and having a tip extending from the tip supporting portion, the tip configured to ignite fuel injected by a fuel injector, and a cooling sleeve disposed around the tip supporting portion, the cooling sleeve defining a path of heat transfer between the tip supporting portion and the housing.

In a further aspect, there is provided a method for cooling an igniter of an internal combustion engine, comprising: transferring heat from the igniter to a cooling sleeve disposed around the igniter; transferring heat through the cooling sleeve; and transferring heat from the cooling sleeve to a housing of the internal combustion engine.

DESCRIPTION OF THE DRAWINGS

Reference is now made to the accompanying figures in which:

FIG. 3 is a schematic tridimensional view of an igniter assembly in accordance with a particular embodiment, which may be used in conjunction with the engine of FIG. 1;

DETAILED DESCRIPTION

Figure 1:
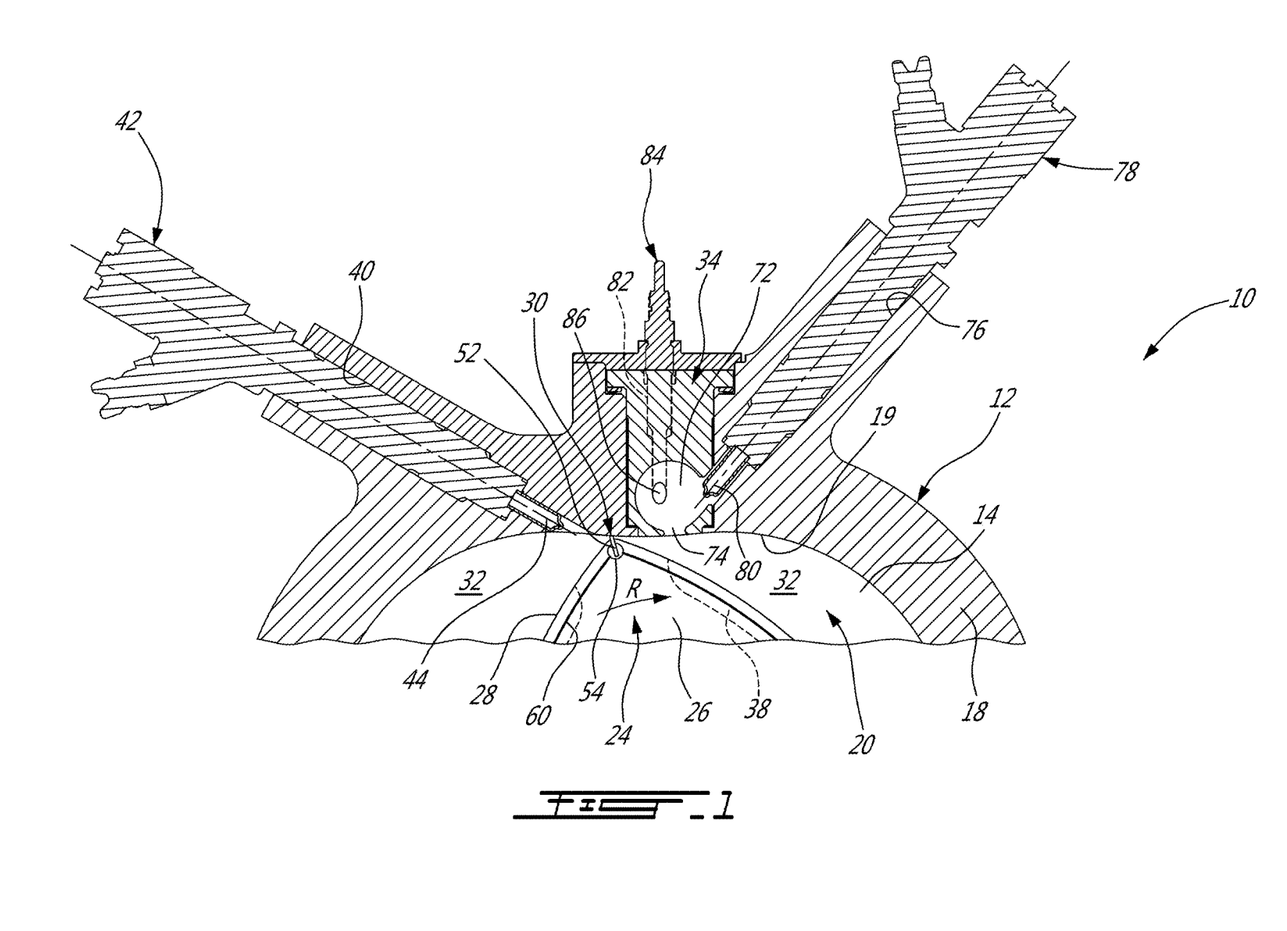
FIG. 1 is a schematic partial cross-sectional view of an internal combustion engine in accordance with a particular embodiment.

Referring to FIG. 1, an internal combustion engine 10 including a rotor assembly configured as a rotary intermittent internal combustion engine 10 is schematically and partially shown.

In a particular embodiment, the engine 10 is used in a compound cycle engine system or compound cycle engine such as described in Lents et al.'s U.S. Pat. No. 7,753,036 issued Jul. 13, 2010 or as described in Julien et al.'s US patent No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The compound cycle engine system may be used as a prime mover engine, such as on an aircraft or other vehicle, or in any other suitable application. In any event, in such a system, air is compressed by a compressor before entering the engine 10, and the engine 10 drives one or more turbine(s) of the compound engine. In another embodiment, the engine 10 is used without a turbocharger, with air at atmospheric pressure.

Still referring to FIG. 1, the internal combustion engine 10 may include one or more rotor assemblies known as a Wankel engine (one in the embodiment shown) and each comprising an outer body, or housing 12, having axially-spaced end walls 14 with a peripheral wall 18 extending therebetween to form an internal cavity 20. The inner surface 19 of the peripheral wall 18 of the internal cavity 20 has a profile defining two lobes, which is preferably an epitrochoid. Although FIG. 1 illustrates a Wankel engine, the present disclosure may be used with other types of rotary engines, and with other types of intermittent internal combustion engines (see FIG. 6 as a possible embodiment). The engine 10 may have other configurations than that illustrated without departing from the scope of the present disclosure.

Still referring to FIG. 1, an inner body or rotor 24 is received within the internal cavity 20 of the housing 12, with the geometrical axis of the rotor 24 being offset from and parallel to the axis of the housing 12. The rotor 24 has axially spaced end faces 26 adjacent to the housing end walls 14, and a peripheral face 28 extending therebetween. The peripheral face 28 defines three circumferentially-spaced apex portions 30 (only one of which is shown), and a generally triangular profile with outwardly arched sides. The rotor 24 cooperates with the housing internal cavity 20 to define main combustion chambers 32 of variable volume. The apex portions 30 are in sealing engagement with the inner surface of the peripheral wall 18 to form three rotating main combustion chambers 32 (only two of which are partially shown) between the inner rotor 24 and housing 12. A recess 38 is defined in the peripheral face 28 of the rotor 24 between each pair of adjacent apex portions 30, to form part of the corresponding chamber 32.

The main combustion chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the internal cavity 20. Each face seal 60 is in sealing engagement with the end seal 54 adjacent each end thereof.

Although not shown in FIG. 1, the rotor 24 is configured to be journaled on an eccentric portion of a shaft (not shown) and includes a phasing gear co-axial with the rotor axis, which is meshed with a fixed stator phasing gear secured to the housing co-axially with the shaft. The rotor 24 rotates the shaft and the meshed gears guide the rotor 24 to perform orbital revolutions within the internal cavity 20. The shaft performs three rotations for each orbital revolution of the rotor 24 in the internal cavity 20. Oil seals are provided around the phasing gear to prevent leakage flow of lubricating oil radially outwardly thereof between the respective rotor end face 26 and housing end wall 14.

At least one inlet port (not shown) is defined through one of the end walls 14 or the peripheral wall 18 for admitting air (atmospheric or compressed) into one of the main combustion chambers 32, and at least one exhaust port (not shown) is defined through one of the end walls 14 or the peripheral wall 18 for discharge of the exhaust gases from the main combustion chambers 32. The inlet and exhaust ports are positioned relative to each other and relative to the igniter and fuel injectors (further described below) such that during each revolution of the rotor 24, each chamber 32 moves around the internal cavity 20 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotor assembly 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

A pilot combustion chamber is defined in the housing 12, for pilot fuel injection and ignition. In the embodiment shown, the pilot combustion chamber defined by a pilot subchamber 72, provided in an insert 34 received in a corresponding insert opening defined through the peripheral wall 18 of the housing 12 and in communication with the internal cavity 20, for pilot fuel injection and ignition. In a particular embodiment, the insert 34 is made of a material having a greater heat resistance than that of the peripheral wall 18, which may be made for example of aluminium. For example, the insert 34 may be made of an appropriate type of ceramic or of an appropriate type of super alloy such as a Nickel based super alloy. Other configurations are also possible, including configurations where the pilot cavity (e.g. pilot subchamber 72) is defined directly in the housing 12, for example in the peripheral wall 18.

The pilot subchamber 72 is in communication with the internal cavity 20. In the embodiment shown, the pilot subchamber 72 has a circular cross-section; alternate shapes are also possible. The pilot subchamber 72 communicates with the internal cavity 20 through at least one opening 74, and has a shape forming a reduced cross-section adjacent the opening 74, such that the opening 74 defines a restriction to the flow between the pilot subchamber 72 and the internal cavity 20. The opening 74 may have various shapes and/or be defined by multiple holes.

The peripheral wall 18 has a pilot injector elongated hole 76 defined therethrough in proximity of the pilot subchamber 72, and in communication with the pilot subchamber 72. A pilot fuel injector 78 is received and retained within the corresponding hole 76, with the tip 80 of the pilot injector 78 in communication with the main combustion chambers 32 through the pilot subchamber 72.

The insert 34 and/or peripheral wall 18 have an igniter elongated hole 82 defined therein, also in communication with the pilot subchamber 72. An igniter or ignition element 84 is at least partially received within the hole 82, and retained therein, with the tip of the igniter 84 configured to ignite the fuel injected by the pilot injector 78. In the embodiment shown, the tip of the igniter communicates with the pilot subchamber 72, for example by having the igniter 84 extending outside of the pilot subchamber 72 and the igniter elongated hole communicating with the pilot subchamber 72 through an opening or passage 86 aligned with the igniter tip. In the embodiment shown, the igniter 84 is a glow plug. Alternate types of igniters 84 which may be used include, but are not limited to, plasma ignition, laser ignition, spark plug, microwave emitter, etc.

It is understood that the pilot subchamber 72 may be omitted; in a particular embodiment which is not shown, the pilot subchamber 72 is replaced by any other suitable type of pilot cavity formed in the housing 12, for example a recess defined in the peripheral wall 18. The pilot fuel injector 78 and the igniter 84 communicate with the pilot cavity so as to perform the fuel ignition therein.

The peripheral wall 18 also has a main injector elongated hole 40 defined therethrough, in communication with the internal cavity 20 and spaced apart from the pilot cavity and pilot injector 78. A main fuel injector 42 is at least partially received within this corresponding hole 40 and is retained therein. The tip 44 of the main injector 42 communicates with the internal cavity 20 at a point spaced apart from the communication between the pilot cavity and internal cavity 20 (e.g. from the subchamber opening 74), so as to communicate directly with the main combustion chambers 32. The main injector 42 is located rearwardly of the subchamber opening 74 with respect to the direction R of the rotor rotation and revolution, i.e. upstream from the communication 74 between the pilot subchamber 72 and main combustion chambers 32, and is angled to direct fuel forwardly into each of the rotating chambers 32 sequentially with a tip hole configuration designed for an adequate spray.

Figure 2:
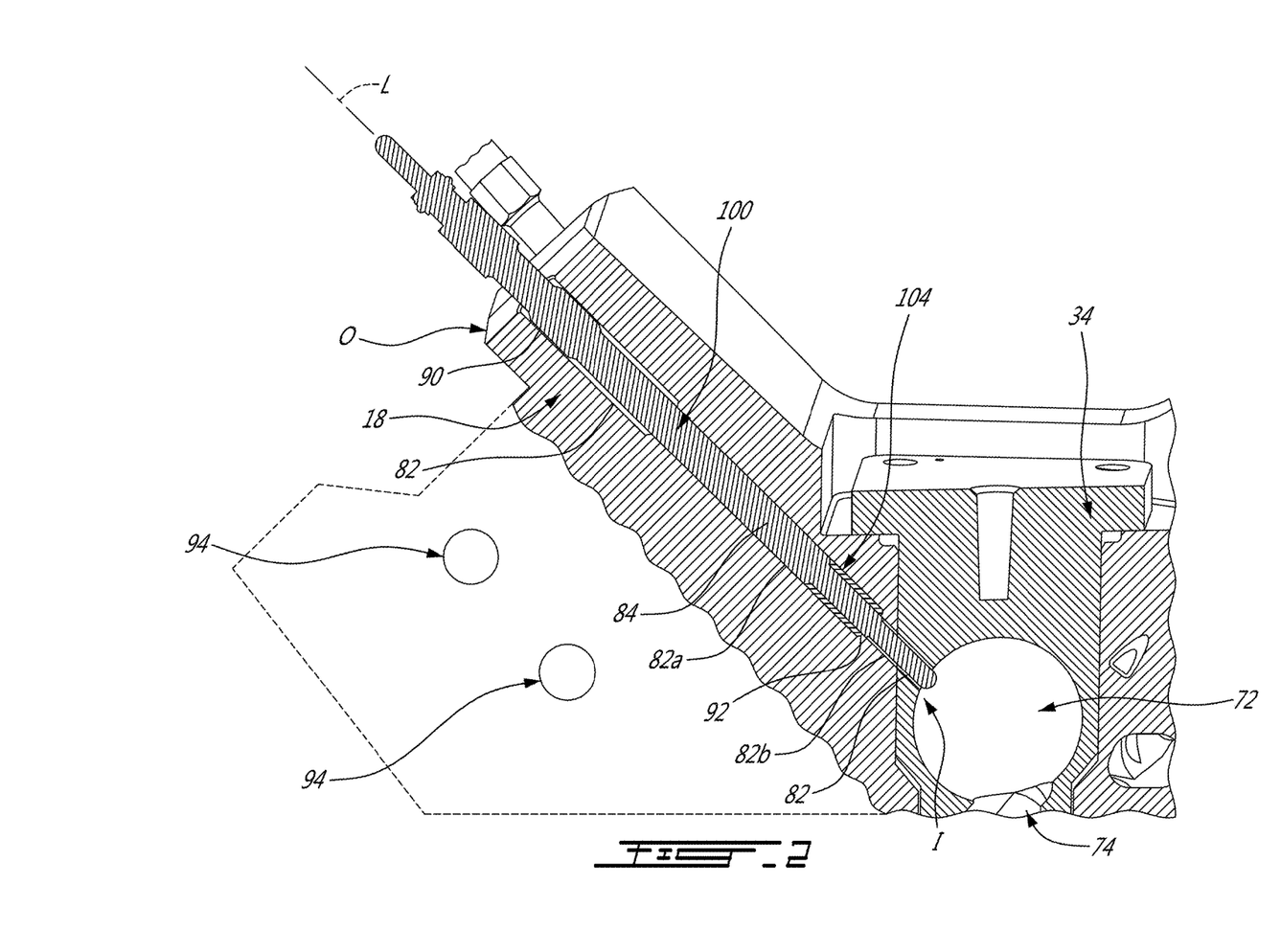
FIG. 2 is a schematic cross-sectional view of a part of a housing of an internal combustion engine, in accordance with a particular embodiment, which may be used in conjunction with the internal combustion engine of FIG. 1.

Now referring to FIG. 2, the subchamber 72 is constantly exposed to hot combustion gases and, in a particular embodiment, the housing 12 and insert 34 may require cooling. In the illustrated embodiment, the peripheral wall 18 comprises a cooling circuit including conduits 94 extending within the housing 12. The conduits 94 are configured for circulating a coolant, such as water, to extract heat from the housing 12. The cooling circuit is configured to circulate the coolant from the conduits 94 through a heat exchanger (not shown) before recirculation into the conduits 94. The conduits 94 are disposed to be in proximity to the subchamber 72 to promote heat extraction therefrom to ensure a controllable temperature. The conduits 94 are positioned so that the subchamber 72 remains hot during operation to ensure ignition, but is sufficiently cooled to prevent overheating. The conduits 94 are also positioned to provide adequate cooling to the housing 12, which in a particular embodiment is made of aluminum.

Still referring to FIG. 2, in the illustrated embodiment, the igniter elongated hole 82 extends through the peripheral wall 18 and through the insert 34 and is configured for receiving an igniter assembly 100 that is described in further detail herein below. The igniter elongated hole 82 extends along a longitudinal axis L from a radially outer end O toward a radially inner end I. It is understood that the particular angle shown between the longitudinal axis L of the igniter elongated hole 82 and the housing inner surface 19 is exemplary only and any other suitable orientation may be used. The igniter hole 82 defines an outward section 82a, proximate the outer end O and an inward section 82b, proximate the inner end I. In the embodiment shown, a portion of the outward section 82a includes threads 90. A diameter of the inward section 82b is smaller than a diameter of the outward section 82a. A transition between the inward and outward sections 82b, 82a defines an annular abutting surface 92 facing toward the outer end O.

Figures 4, 5:
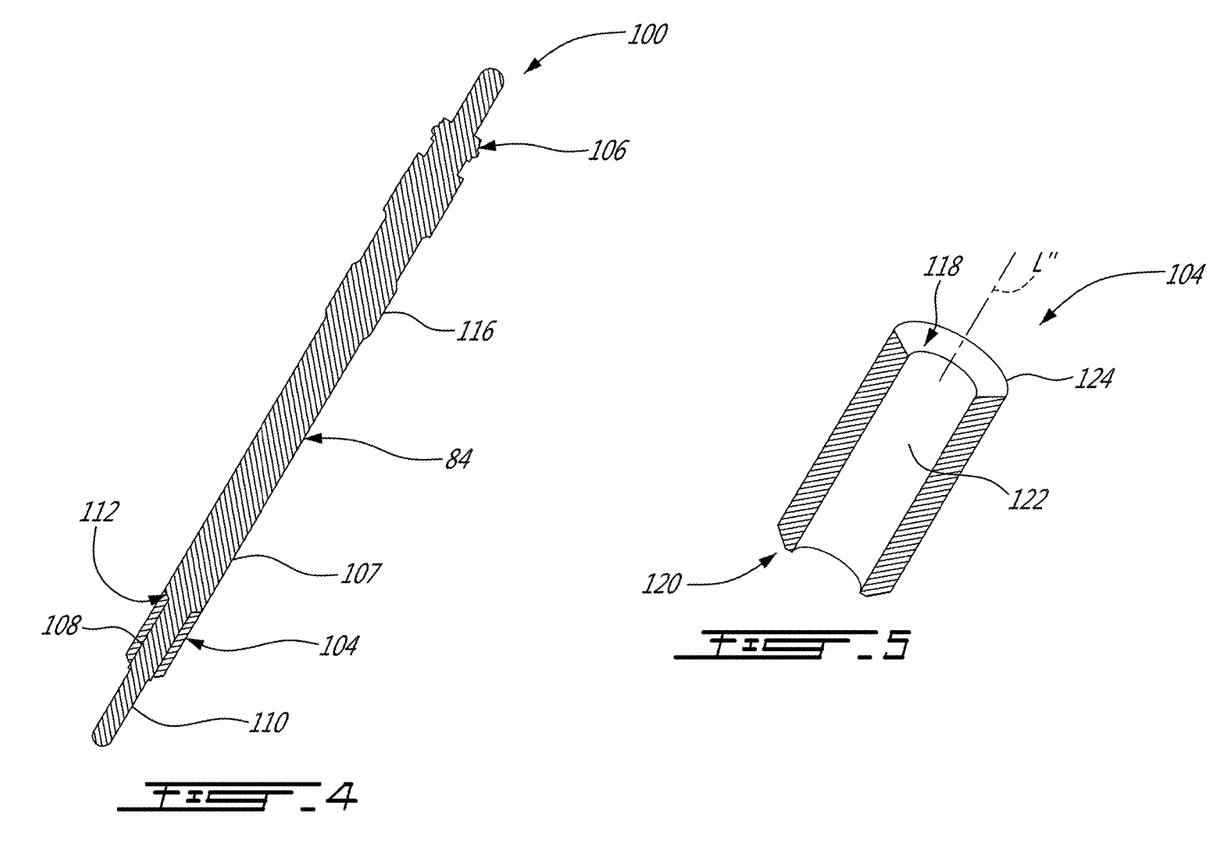
FIG. 4 is a schematic cross-sectional view of the igniter assembly of FIG. 3.
FIG. 5 is a schematic cross-sectional view of a cooling sleeve of the igniter assembly of FIG. 3.

Now referring to FIGS. 3 and 4, the igniter assembly 100 comprises the igniter 84 and a cooling sleeve 104. In a particular embodiment, the igniter 84 is a glow plug. The igniter 84 longitudinally extends along a longitudinal axis L' and defines, from one extremity to another, a connecting section 106, a body 107, and a tip 110. The connecting section 106 is configured to receive power from a power source (not shown). The body 107 defines a tip supporting portion 108, which in the embodiment shown is of a diameter less than a diameter of a remainder of the body 107. The tip 110 has a diameter less than a diameter of the tip supporting portion 108, and is retained to the body 107 by the tip supporting portion 108. The tip 110 protrudes from the tip supporting portion 108 of the body 107.

In the embodiment shown, the body 107 defines an annular abutting surface 112 where its diameter decreases to define the tip supporting portion 108. The abutting surface 112 faces toward the igniter tip 110. It is understood that the tip supporting portion 108 may alternately have the same diameter than the remainder of the body 107, for example without any visible distinction between the tip supporting portion 108 and the remainder of the body 107; in this case, the annular abutting surface 112 is omitted.

In the embodiment shown, an intersection between the tip supporting portion 108 and the tip 110 defines another annular abutting surface 114 facing toward the igniter tip 110. In the embodiment shown, the igniter body 107 includes threads 116 between the connecting section 106 and the tip supporting portion 108, for engaging the threads 90 of the igniter hole 82; alternately, any other suitable retention method may be used.

In a particular embodiment, the igniter tip 110 is a ceramic tip and the igniter body 107, including the tip supporting portion 108, is made of metal. Other materials may be used without departing from the scope of the present disclosure. For example, in a particular embodiment, both the igniter body 107 and tip 110 are metallic.

In a particular embodiment, inadequate cooling of the igniter 100 may cause its tip supporting portion 108 to break and to release the tip 110 in the main combustion chamber 32 which may cause foreign object damage to the engine 10. This may be more critical in a situation in the parts of the igniter 107 proximate the subchamber 72 and constantly exposed to hot combustion gases, and hence more prone to failure. As can be shown in FIG. 2, the cooling sleeve 104 is provided between the tip supporting portion 108 and the wall of the housing 12 to define a path of heat transfer therebetween, which in a particular embodiment allows for adequate cooling of the igniter through the cooling sleeve 104. The cooling sleeve 104 is made of a material having a sufficient thermal conductivity to provide for sufficient heat transfer therethrough.

Now referring also to FIG. 5, in a particular embodiment the cooling sleeve 104 is provided in the form of a hollow cylinder having a longitudinal axis L" and is configured for matching the shape of the igniter tip supporting portion 108. Both extremities of the cooling sleeve 104 defines annular and opposed abutting surfaces 118 and 120. The cooling sleeve 104 has an inner surface 122 facing toward the longitudinal axis L" of the cooling sleeve and an outer surface 124 facing away from the axis L". In the illustrated embodiment, both the inner and outer surfaces 122 and 124 are cylindrical.

The cooling sleeve 104 is disposed around the igniter tip supporting portion 108. In the embodiment shown, the sleeve abutting surface 118 abuts against the igniter abutting surface 112 defined where the igniter body 107 decreases in diameter to define the tip supporting portion 108. The cooling sleeve inner surface 122 faces toward the igniter tip supporting portion 108, and the inner surface 122 of the cooling sleeve 104 contacts the outer surface of the igniter tip supporting portion 108. In a particular embodiment, the inner surface 122 of the cooling sleeve 104 has a tight fit with the outer surface of the igniter tip supporting portion 108. In the illustrated embodiment, a length of the cooling sleeve 104 along the longitudinal axis L' or L" is less than the distance between the igniter abutting surfaces 112 and 114 along the longitudinal axis L'. In the illustrated embodiment, a diameter of the outer surface 124 of the cooling sleeve 104 corresponds to a diameter of the outer surface of the remainder of the igniter body 107.

In a particular embodiment, the cooling sleeve 104 is configured to overlap with part of the section of the igniter 84 that transitions from the body 107 to the tip 110. In the illustrated embodiment, this transition corresponds to the tip supporting portion 108 in which the igniter 84 transitions from alloy to ceramic.

Now referring to FIGS. 2 to 5, in use and in a particular embodiment, the igniter assembly 100 is inserted from an outer side O of the housing 12 in the igniter elongated hole 82. Then, the igniter 84 is screwed using the matching igniter threads 116 and the igniter elongated hole threads 90 until the cooling sleeve abutting surface 120, proximate the igniter tip 110, is proximate to, or abuts against, the igniter hole abutting surface 92. In the embodiment shown, the outer surface 124 of the cooling sleeve 104 contacts the surface of the igniter hole 82. In the embodiment shown, the longitudinal axes L, L', L" of the igniter hole 82, igniter 84 and cooling sleeve 104 coincide.

In a particular embodiment, the cooling sleeve 104 allows for improved cooling by decreasing a thickness of an annular air gap between the igniter tip supporting portion 108 and the igniter elongated hole 82. As air is an insulant, decreasing the thickness of the air gap decreases a thermal resistance of a thermal path from the igniter 84 toward the housing 12. In a particular embodiment, the cooling sleeve 104 is made of copper. Alternatively, the cooling sleeve may be made of any material suitable to provide a path for heat transfer between the igniter 84 and the housing 12, for example any material having a high thermal conductivity; the cooling sleeve 104 may be made of the same material as the housing 12, or of a different material. In the embodiment shown, the thermal resistance is further reduced by having the cooling sleeve inner surface 122 and outer surface 124 contacting with the outer surface of the igniter 84 and the surface of the igniter hole 82, respectively.

In the illustrated embodiment, heat generated by the igniter tip 110 is transmitted to the igniter tip supporting portion 10, and then transmitted from the igniter 84 to the cooling sleeve inner surface 122 disposed around the igniter 84. Heat is then transmitted through the cooling sleeve 104, from the cooling sleeve inner surface 122 to the cooling sleeve outer surface 124. Heat is then transferred from the cooling sleeve outer surface 124 to the housing 12, and through the housing 12 to the coolant circulating in the conduits 94 defined in the housing 12. The conduits 94 are thus in heat exchange relationship with the cooling sleeve 104 through the peripheral wall 18 of the housing 12.

Figure 6:
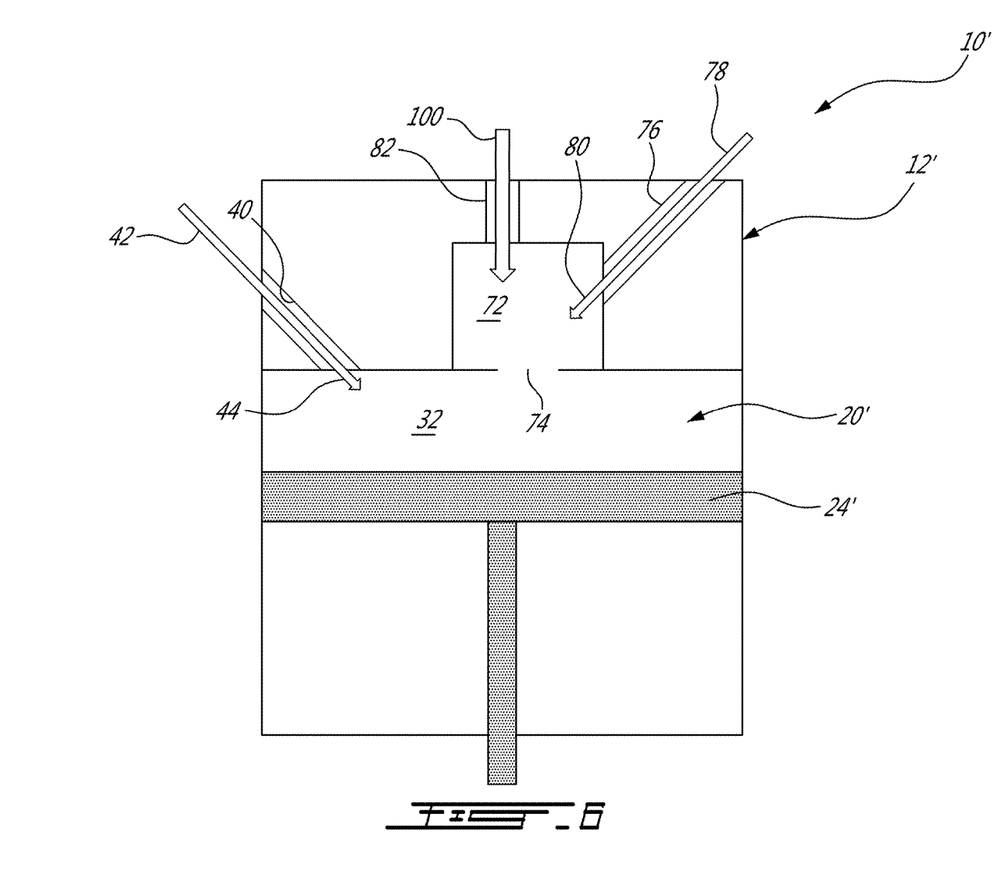
FIG. 6 is a schematic cross-sectional view of a reciprocating piston assembly in accordance with a particular embodiment, which may be used in conjunction with the part of the housing of FIG. 2 and with the igniter assembly of FIG. 3.
Figure 7:
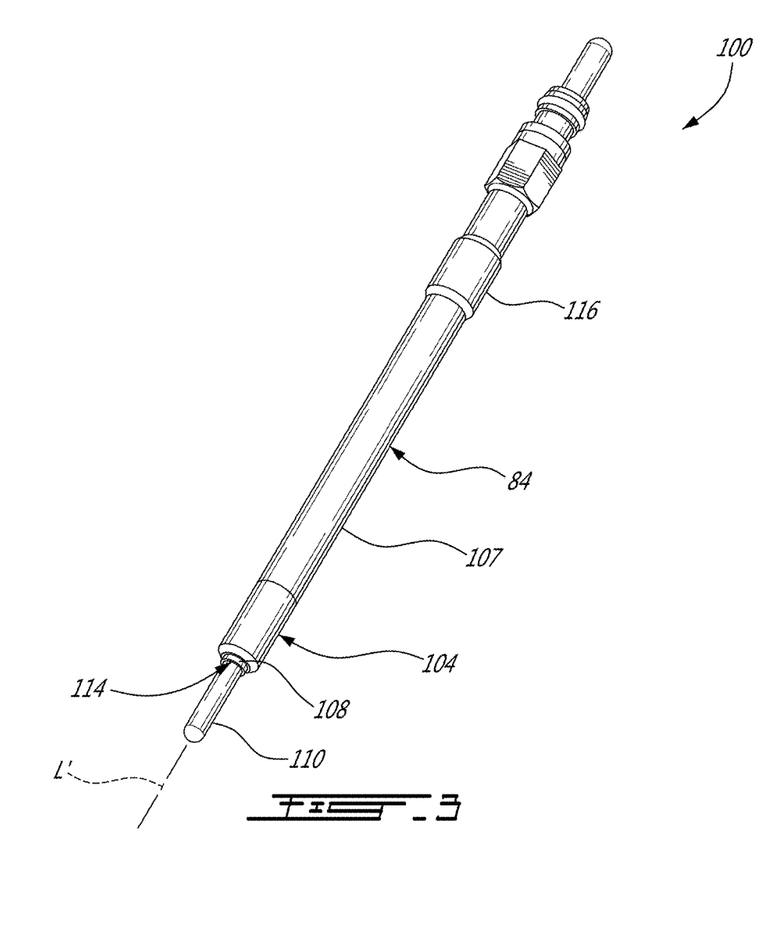

Now referring to FIG. 6, in another particular embodiment the engine is a reciprocating intermittent internal combustion engine, which includes one or more cylinders 10' each receiving an inner body in the form of a reciprocating piston 24'. Each piston 24' is received in a corresponding internal cavity 20' of the cylinder housing 12' to define a main combustion chamber 32 of variable volume and undergoing the four stroke phases of intake, compression, expansion and exhaust, with the reciprocating pistons 24' engaged to the engine shaft. The engine includes, for each cylinder 10', a main injector 42, an igniter 84 disposed at least partially within the igniter elongated hole 82 defined through the cylinder housing 12', a pilot combustion chamber in the form of a pilot subchamber 72 or any other suitable pilot cavity communicating with the main combustion chamber 32 spaced from the main injector 42, and a pilot injector 78 in communication with the main combustion chamber 32 through the pilot subchamber 72. The igniter hole 82 may be configured similarly to the hole of the engine 10 described herein above, and the igniter assembly 100, including the cooling sleeve 104, may be configured as described above. In a particular embodiment, the igniter elongated hole 82 opens to a subchamber 72 and the igniter tip is positioned to ignite fuel from the pilot injector 78.

In another embodiment which is not shown, the intermittent combustion engine (rotary engine, reciprocating engine, etc.) does not include a pilot injection; the igniter 84 is configured to ignite the fuel injected by the main injector 42. The igniter 84 forms part of the igniter assembly 100, including the cooling sleeve 104, as described above.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method for cooling an igniter of an internal combustion engine, comprising:
   transferring heat from the igniter to a cooling sleeve disposed around the igniter;
   transferring heat through the cooling sleeve;
   transferring heat from the cooling sleeve to a housing of the internal combustion engine; and
   wherein the internal combustion engine is a Wankel rotary engine, including a rotor having three apex portions mounted for eccentric revolutions within an internal cavity defined in the housing, the internal cavity having an epitrochoid shape with two lobes.

2. The method as defined in claim 1, wherein the steps of transferring heat from the igniter to the cooling sleeve and from the cooling sleeve to the housing are performed with the cooling sleeve contacting the igniter and the housing.

3. The method as defined in claim 1, further comprising transferring heat from the housing to a coolant circulating in conduits defined in the housing.

4. A rotary engine comprising:
   a housing having an internal cavity;
   a rotor received in the internal cavity and cooperating with the housing to define combustion chambers of variable volume in the internal cavity;
   a fuel injector communicating with the combustion chambers;
   an igniter disposed at least partially within an aperture defined in the housing, the igniter having a body including a tip supporting portion and having a tip extending from the tip supporting portion, the tip configured to ignite fuel injected by the fuel injector; and
   a cooling sleeve received in the aperture and disposed around the tip supporting portion, the cooling sleeve defining a path of heat transfer between the tip supporting portion and the housing.

5. The rotary engine as defined in claim 4, wherein the housing includes a pilot subchamber in successive communication with the combustion chambers, the fuel injector is a pilot fuel injector communicating with the combustion chambers through the pilot subchamber, and wherein the tip of the igniter is in communication with the pilot subchamber.

6. The rotary engine as defined in claim 4, wherein the cooling sleeve is in contact with the tip supporting portion and with a surface of the housing defining the aperture.

7. The rotary engine as defined in claim 4, wherein the tip supporting portion has a reduced outer diameter relative to that of a remainder of the body.

8. The rotary engine as defined in claim 1, wherein an outer diameter of the cooling sleeve corresponds to an outer diameter of the remainder of the body.

9. The rotary engine as defined in claim 4, further comprising a plurality of conduits extending through the housing and configured for circulating a coolant, the plurality of conduits in heat exchange relationship with the cooling sleeve through the wall of the housing.

10. The rotary engine as defined in claim 4, wherein the cooling sleeve is made of copper.

11. The rotary engine as defined in claim 4, wherein the body of the igniter is metallic and the tip of the igniter is made of ceramic.

12. The rotary engine as defined in claim 4, wherein the rotary internal combustion engine is a Wankel rotary engine, the rotor having three apex portions mounted for eccentric revolutions within the internal cavity, the internal cavity having an epitrochoid shape with two lobes.

13. An internal combustion engine comprising a housing defining a cavity and an inner body sealingly moving inside the cavity for defining at least one combustion chamber of variable volume, the internal combustion engine further comprising an igniter disposed at least partially within an aperture extending through the housing, the igniter having a body including a tip supporting portion and having a tip extending from the tip supporting portion, the tip configured to ignite fuel injected by a fuel injector, and a cooling sleeve disposed around the tip supporting portion, the cooling sleeve defining a path of heat transfer between the tip supporting portion and the housing;

wherein the housing includes a pilot subchamber in communication with the at least one combustion chamber, the fuel injector is a pilot fuel injector communicating with the pilot subchamber, and the tip of the igniter is in communication with the pilot subchamber.

14. The internal combustion engine as defined in claim 13, wherein the housing further has a plurality of conduits defined therein for circulating a coolant, the conduits in heat exchange relation.

15. The internal combustion engine as defined in claim 14, wherein an outer diameter of the cooling sleeve corresponds to an outer diameter of the remainder of the body.

16. The internal combustion engine as defined in claim 13, wherein the tip supporting portion has a reduced outer diameter relative to that of a remainder of the body.

17. The internal combustion engine as defined in claim 13, wherein the cooling sleeve is in contact with the tip supporting portion and with a surface of the housing defining the aperture.

18. The internal combustion engine as defined in claim 13, wherein the igniter is a glow plug.

\* \* \* \* \*